R. G. MARX.
SHOCK ABSORBER.
APPLICATION FILED DEC. 20, 1915.
1,259,892.
Patented Mar. 19, 1918.
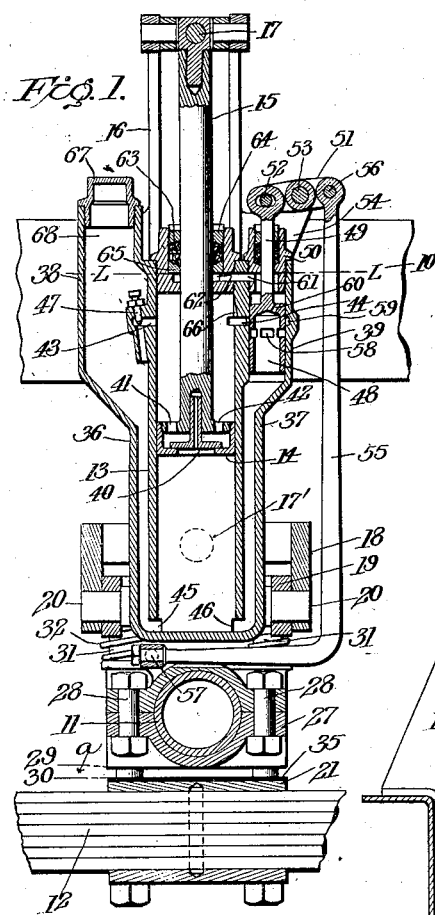
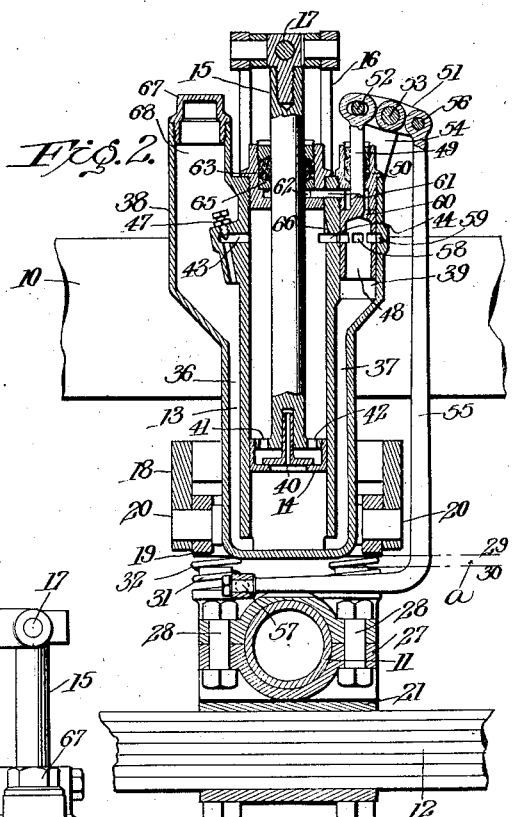
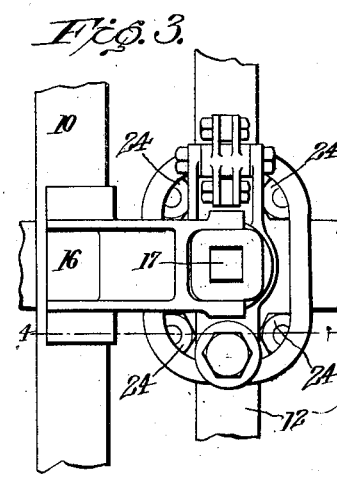
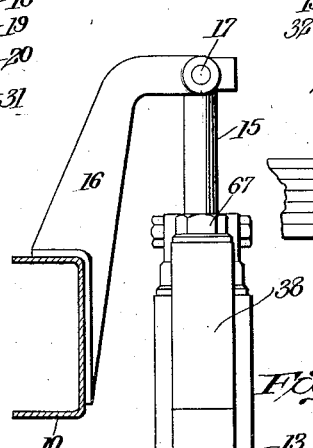
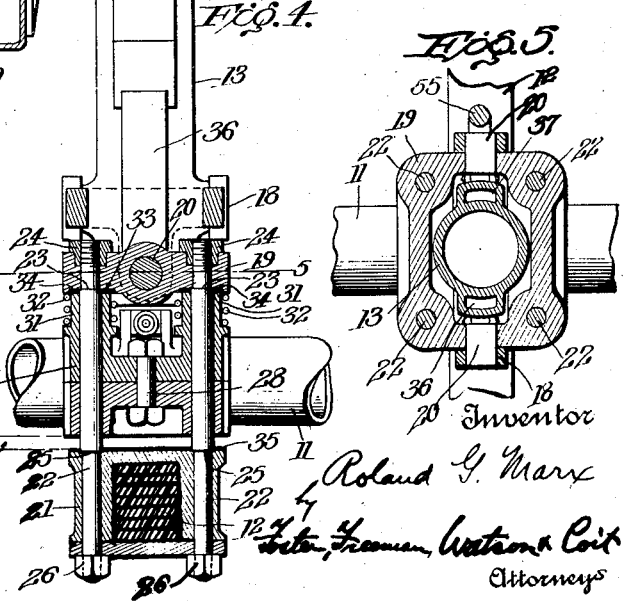
Inventor
Roland G. Marx
by
Foster, Freeman, Watson & Coit
Attorneys

UNITED STATES PATENT OFFICE.

ROLAND G. MARX, OF PALO ALTO, CALIFORNIA.

SHOCK-ABSORBER.

1,259,892.　　　　　Specification of Letters Patent.　　Patented Mar. 19, 1918.

Application filed December 20, 1915. Serial No. 67,832.

*To all whom it may concern:*

Be it known that I, ROLAND G. MARX, a citizen of the United States, and resident of Palo Alto, county of Santa Clara, State of California, have invented certain new and useful Improvements in Shock-Absorbers, of which the following is a specification.

This invention relates to shock absorbers, and more particularly to shock absorbers for automobiles and other vehicles which are provided with springs between the frame and axle.

In existing shock absorbers designed to dampen the oscillations of the body after a compression of the springs, there is a tendency to hold the wheels from the ground when the springs have been abnormally compressed upon suddenly striking and passing over an obstruction in the road. The wheels are driven up toward the body, due to the sudden jar, the shock absorber offering no resistance, and when the vehicle has passed over the obstruction its inertia tends to hold it momentarily off the ground. It is important that the wheels be immediately thrust down onto the road after such a compression so as to prevent the jar otherwise occasioned when the wheels strike the road.

Shock absorbers heretofore used, which are adapted to normally dampen the recoil oscillations of the body, prevent the free downward movement of the wheels when the wheels are momentarily thrown off the ground and for this reason have not been entirely satisfactory.

My invention provides means for effectively preventing excessive oscillation of the body on the recoil of the springs and also for releasing the wheels from the checking action of the shock absorber whenever the wheels are raised from the ground, so that they will be immediately thrust by the recoil of the springs against the ground to prevent the jar to the body which would otherwise result.

A shock absorber embodying the invention is shown in the accompanying drawings in which:—

Figure 1 is a longitudinal section with parts of the vehicle shown in elevation;

Fig. 2 is a similar view showing the parts in a different position;

Fig. 3 is a top plan view;

Fig. 4 is a section on the line 4—4 of Fig. 3;

Fig. 5 is a section through line 5—5 of Fig. 4.

Referring to the drawings, it will be observed that a portion of the body of the vehicle is shown at 10, the axle at 11, and a leaf spring for supporting the body on the axle at 12, this spring being shown as passing under the axle, although the invention is not limited to this arrangement. The shock absorber is arranged between the frame and spring in a manner hereinafter to be described, and is of such design as to freely permit compression movements of the spring, but to dampen or hinder the extension movements except when the wheels are raised from the ground.

The shock absorber comprises a cylinder 13 having a piston 14 therein. The piston 14 has a rod 15 which is connected at its upper end to a bracket 16 on the body 10, by a universal joint 17, and the cylinder 13 is connected at its lower end with the spring 12, by a universal joint comprising trunnions 17' between the cylinder and a member 18 which is in turn pivoted to a plate 19 by two pins 20, the plate 19 being rigidly attached to a yoke 21 on the spring 12, by means of bolts 22. The axes of the trunnions 17' and of the pins 20 are at right angles to each other so that the cylinder is free to rock about either axis and, the piston rod 15 being secured to the bracket 16 by a universal joint 17, it is obvious that the shock absorber will not interfere with the lateral movements of the body relatively to the axle.

The bolts 22 are provided at their upper ends with shoulders 23 and nuts 24 by which they are secured to the plate 19, and are also provided at their lower ends with shoulders 25 and nuts 26 by which they are secured to the yoke 21. The bolts thus hold the plate 19 and the yoke 21 in fixed relation.

The axle 11 passes between the plate 19 and the yoke 21 and is adapted to move vertically between these two members. On the axle 11 is secured a box 27 by means of bolts 28, the box being provided with four vertically disposed openings through which the bolts 22 pass, so that the box is adapted to slide freely up and down on the bolts 22 between the plate 19 and the yoke 21. The height of the box 27 is only slightly less than the distance between the plate 19 and the yoke 21, the difference being shown in Figs. 1, 2 and 4 as the distance (a) between the parallel lines 29 and 30. The axle then is movable relatively to the spring through the short distance a.

The box 27 has four projections or bosses 31 extending upwardly therefrom through which the bolts 22 pass. Around each of these bosses 31 is arranged a coil compression spring 32 which bears against the plate 19 and the box 27 to move them apart. Suitable faces 33 are provided on the lower side of the plate 19 to serve as abutments against which the projections 31 are adapted to strike when the box is at its upper limit of movement.

The lower surface of the box 27 and the upper surface of the yoke 21 are substantially plane. In order to lessen the shock and deaden the noise caused by the box 27 striking against the yoke 21 and the plate 19 I have provided on the ends of projections 31, washers 34, of fiber or other suitable material, and on the upper surface of the yoke 21 a fiber pad 35.

The cylinder 13 is provided with oppositely arranged ducts 36 and 37 which are enlarged at their upper ends to form chambers 38 and 39. The system comprising cylinder 13, ducts 36 and 37 and chambers 38 and 39 is adapted to contain oil, communicating passages between the cylinder, ducts and chambers, permitting this oil to be circulated through the system in the operation of the shock absorber. In Fig. 1 the normal level of the top of the oil in this system is indicated by the line L—L.

The piston 14 is provided with a check valve 40 which permits the flow of fluid upward through openings 41 and 42 therein but which prevents flow in the opposite direction. The cylinder has openings 43 and 44 at the top communicating with the chambers 38 and 39, respectively, and has openings 45 and 46 at the bottom communicating with the ducts 36 and 37, respectively. The bottom openings 45 and 46 are of large area and freely permit the passage of fluid therethrough in either direction. The opening 43 between the top of the cylinder and the chamber 38 is a restricted passage having an adjustable screw 47 coöperating therewith which is adapted to increase or decrease the area of the passage as desired. The port or opening 44 is normally closed by a valve 48 which is controlled by the movement of the axle 11 relatively to the yoke 21, as will hereinafter be described.

Rigidly attached to the top of the valve 48 or integral therewith is an upwardly projecting stem 49 which passes through a stuffing box 50 and has its upper end connected with one end of a walking beam 51 by a pin 52. The walking beam is pivoted at 53 to a bracket 54 secured to the cylinder 13. The other end of the walking beam 51 is connected with the upper end of an L-shaped rod 55 by the pin 56. The rod 55 has its lower end attached by means of a universal joint 57 to the box 27 and is adapted to move the walking beam to operate the valve 48 when the box 27 moves up and down on the bolts 22. Thus when the box 27 is in its normal position resting against plate 19 the valve 48 closes the port 44 as shown in Fig. 1, and when the box is in its lower position resting against the yoke 21 the port 44 is open, as shown in Fig. 2.

The openings 45 and 46 serve as inlet openings into the cylinder 13 from the ducts 36 and 37, and the openings 43 and 44 serve as outlet openings, the fluid passing into the cylinder at the bottom, up through the check valve 40, and out through openings 43 and 44, normally through the former only, but occasionally through both, depending on the position of the valve 48. The passage 43 is small and considerable time is required to discharge the oil, above the piston 14, through this passage when the piston is drawn upwardly. Normally the port 44 is closed, and on a compression movement of the spring 12 the piston descends, forcing the oil up through the check valve 40 and trapping it in the cylinder above the piston. When the spring 12 recoils, the piston 14 tends to rise rapidly but is prevented from doing so by the oil above the piston which can only escape slowly through the restricted opening 43. The above described retardation of the piston 14 would result, in the case of an excessive compression of the spring 12, followed by conditions requiring a rapid expansion, in the wheels being held from the ground, as explained before and to obviate this the valve 48 constitutes means for quickly releasing the oil above the piston and allowing the latter to rise quickly. This valve is preferably a sleeve valve having a series of openings 58 arranged therearound, and adapted to register when the valve is open, with the annular passage 59 which is formed in the wall of the chamber 39 and communicates with the port 44. When the valve 48 is opened all of the openings 58 become passages for the discharge of the oil in the cylinder, which passes through port 44 into the passage 59, thence through the series of openings 58 in the valve 48 and into the chamber 39.

The top of the valve 48 has a passage 60 therethrough and the top of the chamber 39 communicates by means of a passage 61 with a small annular passage or chamber 62 around the piston rod 15, above the top of the cylinder. This passage 61 is designed to convey into the chamber 39 through the opening 60 any oil which may gather in the chamber 62 due to leakage around the piston rod 15. A stuffing box 63 comprising threaded annular rings 64 and 65 above the chamber 62 serves to keep any oil from escaping along the piston rod.

The top of the cylinder 13 above the level openings 43 and 44 is adapted to act as a trap for the oil above the piston to cushion the recoil of the spring 12 and is provided with a groove or by-pass 66, this groove gradually increasing in size toward the lower end and opening into the passage 44. When the piston is drawn into this end of the cylinder its movement is cushioned and the energy is expended in forcing the oil through the by-pass 66.

A threaded air-tight cap 67 is provided at the top of chamber 38 and is adapted to be removed for the introduction of oil into the system. This cap being air-tight the top portion of the chamber 38 above the line L—L, Fig. 1, constitutes an air chamber 68, which allows for variations in the oil level due to the varying amount of oil displaced by the piston rod 15 in moving up and down in the cylinder. The piston rod of course displaces an amount of oil equal to the volume of its submerged portion so that the movements of the piston 14 will result in a raising and lowering of the oil level in chamber 68, and compressing and expanding the air in this chamber.

It is apparent that if the diameter of the piston rod 15 is proportioned properly to the size of the compression chamber 68, the shock absorber will act also as an air spring. In this case the packing around the top of the cylinder and the top of the valve chamber must be made strong to safely withstand the pressure.

The operation is as follows: All movements of the axle 11 toward the frame 10 are unrestricted by the shock absorber due to the free by-passing of the oil by the valve 40, and therefore no shocks reach the frame of the machine except those which are transmitted thereto by the springs.

In the ordinary use of the vehicle, as when running along comparatively smooth roads the box 27 bears against the plate 19 and the valve 48 is held closed, the movements of the frame 10 away from the axle 11 being retarded because of the force required to expel the oil in the cylinder 13 above the piston 14 through the restricted passage 43. The size of the opening of the passage 43 is so regulated by the adjusting screw 47 that after the spring 12 has been compressed the frame 10 returns to its normal position with practically no oscillations. Thus the excess energy stored in the spring is absorbed in forcing the oil through the passage 43 instead of being expended in vibrating the body up and down.

When the vehicle passes over an obstruction in the road which compresses the springs in such a manner that the restriction of the movement of the axle away from the frame, tends to hold the wheel away from the ground, the force of gravity aided by the springs 32 causes the box 27 to drop away from the plate 19. This latter movement opens the valve 48, the pressure above the piston being thereby relieved and the spring 12 is permitted to force the axle quickly toward the ground. The shock absorber thus effectively dampens out the oscillations of the body, without hampering the compression of the vehicle springs, and without a tendency to hold the wheels from the ground at any time.

As explained before the extreme upper portion of the cylinder 13 is arranged to form with the piston a cushioned rebound check to obviate any jar which might be occasioned by the piston being drawn against the upper end of the cylinder, the graduated by-pass 66 allowing the gradual escape of the oil into the passage 44.

It is apparent that many changes may be made in the details of construction and arrangement and I do not limit myself to the form shown.

Having thus described my invention, what I claim and desire to secure by Letters Patent is:

1. In a device of the class described, the combination of a body member, an axle member, a spring interposed between said members and bodily movable relative to one of them, a shock absorber between the spring and one of said members, and means for varying the action of the shock absorber in accordance with the different positions occupied by the spring relatively to the member in relation to which it is bodily movable.

2. In a device of the class described, the combination of a vehicle body, an axle, a spring interposed between the body and axle and bodily movable relative to one of them, a shock absorber between the spring and body, and means for varying the action of the shock absorber in accordance with the different positions occupied by the spring relatively to the member in relation to which it is bodily movable.

3. In a device of the class described, the combination of a vehicle body, an axle, a spring interposed between the body and axle and bodily movable relative to the latter, a shock absorber between the spring and body, and means for varying the action of the shock absorber in accordance with the different positions assumed by the axle relatively to the spring.

4. In a device of the class described, the combination of a vehicle body, an axle, a spring interposed between the axle and body, a member secured to the spring, a member secured to the axle, means connecting said members and permitting a restricted vertical bodily movement therebetween, a shock absorber between the spring and body, and means for varying the action of said shock absorber in accordance with different positions occupied by one of said members relatively to the other.

5. In a device of the class described, the combination of a vehicle body, an axle, a spring for supporting the body, means connecting the spring with the axle and adapted to permit a restricted bodily movement therebetween, a shock absorber connected with the body and said means, and means for varying the action of the shock absorber in accordance with different positions occupied by the axle relatively to said spring.

6. In a device of the class described, the combination of a vehicle body, an axle, a spring adapted to support the body from the axle, a member rigidly secured to the spring, a member secured to the axle, means secured to one of said members and having a sliding connection with the other of said members connecting said members and permitting a restricted vertical bodily movement therebetween, a shock absorber connected with the body and said means, and means for varying the action of the shock absorber in accordance with the different positions occupied by one of said members relatively to the other.

7. In a device of the class described, the combination of a vehicle body, a spring interposed between the axle and body and having a member secured thereto, a plate rigidly attached to said member in fixed spaced relation thereto, an axle between said plate and said member and movable relatively thereto, a shock absorber between the vehicle body and spring, and means for varying the action of the shock absorber in accordance with the different positions occupied by the axle relatively to said member.

8. In a device of the class described, the combination of a vehicle body, an axle, a member secured to said axle, a spring interposed between the axle and body and having a member secured thereon, bolts rigidly secured to said last mentioned member and slidably engaging said first mentioned member, a plate secured to said bolts and adapted to normally engage said first mentioned member, a shock absorber pivotally connected with said plate and said body, and means for varying the action of said shock absorber in accordance with the different positions occupied by said axle relatively to said spring.

9. In a device of the class described, the combination of a cylinder, a reciprocating piston therein, a rod secured to the piston and extending through an end of the cylinder, a chamber on the end of the cylinder through which the piston rod extends adapted to collect fluid escaping from the cylinder around the piston rod, and a constantly operative by-pass for returning fluid collected in said chamber to the cylinder on the opposite side of the piston therein from that from which the rod extends.

10. In a device of the class described, the combination of a vehicle body, a body supporting spring, a member secured to said spring, a plurality of bolts secured to said member and extending upwardly therefrom, an axle above said spring, a member secured to the axle and having openings therein adapted to receive said bolts, said second mentioned member being movable bodily relatively to said first mentioned member, a plate secured to the upper ends of said bolts and adapted to limit the movement of said second mentioned member, a plurality of springs between said plate and said second mentioned member normally tending to hold said second mentioned member against said first mentioned member, a shock absorber pivotally secured to said plate and to said body, and means for varying the action of said shock absorber in accordance with the different positions occupied by said axle relatively to said spring.

11. In a device of the class described, the combination of a vehicle body, an axle, a spring interposed between the body and axle and movable bodily relatively to the latter, a shock absorber connecting the spring and body and comprising a cylinder, a piston, and means for restricting the free movement of said piston in said cylinder, and means for varying the action of the shock absorber in accordance with the different positions occupied by the axle relatively to said spring.

12. In a device of the class described the combination of a vehicle body member, an axle member, a spring interposed between said members and movable bodily relative to one of them, a shock absorber comprising a relatively movable cylinder and piston, one of said parts being connected with the vehicle body and the other with the spring, means normally retarding relative movement between the piston and cylinder in one direction while permitting substantially free movement in the opposite direction, and means adapted to be automatically operated by bodily movement of the spring for reducing the retarding action of the retarding means.

13. In a device of the class described the combination of a vehicle body member, an axle member, a spring interposed between said members and movable bodily relative to one of them, a shock absorber comprising a relatively movable cylinder and piston, one of said parts being connected with the vehicle body and the other with the spring, means normally retarding relative movement between the piston and cylinder in one direction while permitting substantially free movement in the opposite direction, and a valve adapted to be positively operated by a change in the relation between the spring and the member as to which it is relatively bodily movable for reducing the retarding action of the retarding means.

14. In a device of the class described, the combination of a vehicle body member, an axle member, a spring interposed between said members, said parts being connected by means permitting relative bodily movement between one of said members and the spring, a shock absorber comprising a relatively movable cylinder and piston one of which is connected to the body member and the other to the spring, means for freely by-passing fluid from one side of the piston to the other, means for restrictedly by-passing fluid in the opposite direction from one side of the piston to the other, and means automatically controlled by a change in the relative positions of the spring and member which is bodily movable relative thereto for reducing the restriction to by-passing of fluid from one side of the piston to the other in the direction in which such movement is restricted.

15. In a device of the class described, the combination of a vehicle body member, an axle member, a spring interposed between said members and connected with the axle by means permitting relative bodily movement between the spring and axle, a shock absorber comprising a relatively movable cylinder and piston one of which is connected to the body member and the other to the spring, a restricted duct for by-passing fluid from one side of the piston to the other to permit the retarded motion of the piston in one direction, a check valve in the piston adapted to freely by-pass fluid through the piston in a direction opposite to the direction of flow through said restricted duct, and an auxiliary by-passing means adapted to be automatically operated by relative bodily movement between the spring and axle to reduce the retardation of movement of the piston in the first said direction.

16. In a device of the class described, the combination of a vehicle body member, an axle member, a spring interposed between said members and connected with one of them by means permitting relative bodily movement between it and said member, a shock absorber comprising a relatively movable cylinder and piston one connected to the body member and the other to the spring, the cylinder having two ports formed therein adjacent one end, means restricting the passage of fluid through one of said ports to retard relative movement between the piston and cylinder in one direction, a valve in the piston permitting free movement between the cylinder and piston in the opposite direction, a by-pass communicating with the second port in the cylinder, a valve normally closing said second port, and means for actuating the valve adapted to be positively operated by bodily relative movement between the spring and one of the members connected thereby, for the purpose described.

In testimony whereof I affix my signature.

ROLAND G. MARX.